(12) United States Patent
Spierling

(10) Patent No.: US 11,999,473 B2
(45) Date of Patent: Jun. 4, 2024

(54) SELF-ORIENTING PODS

(71) Applicant: Hamilton Sundstrand Corporation, Charlotte, NC (US)

(72) Inventor: Todd A. Spierling, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 169 days.

(21) Appl. No.: 17/382,636

(22) Filed: Jul. 22, 2021

(65) Prior Publication Data

US 2022/0033071 A1 Feb. 3, 2022

Related U.S. Application Data

(60) Provisional application No. 63/057,702, filed on Jul. 28, 2020.

(51) Int. Cl.
*B64C 27/52* (2006.01)
*B64D 27/24* (2006.01)

(52) U.S. Cl.
CPC .............. *B64C 27/52* (2013.01); *B64D 27/24* (2013.01)

(58) Field of Classification Search
CPC . B64C 27/25; B64C 29/0033; B64C 29/0075; B64C 27/28; B64D 27/24
See application file for complete search history.

(56) References Cited

U.S. PATENT DOCUMENTS

| | | | |
|---|---|---|---|
| 2,926,868 A * | 3/1960 | Taylor | B64C 29/0075 244/12.4 |
| 2,961,189 A | 11/1960 | Doak | |
| 2,974,900 A | 3/1961 | Morris et al. | |
| 3,154,916 A * | 11/1964 | Eichholtz | B64C 29/0066 60/228 |
| 4,613,097 A * | 9/1986 | Jordan | B64C 29/0033 244/12.4 |
| 8,602,348 B2 | 12/2013 | Bryant | |
| 9,994,313 B2 | 6/2018 | Claridge et al. | |
| 10,287,011 B2 | 5/2019 | Wolff et al. | |
| 10,450,062 B1 | 10/2019 | Bova et al. | |
| 10,556,700 B2 | 2/2020 | Bevirt et al. | |
| 2015/0344134 A1 | 12/2015 | Cruz Ayoroa | |
| 2016/0101853 A1 | 4/2016 | Toppenberg | |
| 2019/0009901 A1* | 1/2019 | Luo | B64C 29/0033 |
| 2020/0047906 A1 | 2/2020 | Keennon et al. | |

FOREIGN PATENT DOCUMENTS

WO 2019/202325 A1 10/2019

OTHER PUBLICATIONS

Extended European Search Report dated Jan. 18, 2022, issued during the prosecution of European Patent Application No. EP 21188148.7.

* cited by examiner

*Primary Examiner* — Philip J Bonzell

(57) ABSTRACT

A system includes an electric motor. A drive shaft is connected to be driven by the electric motor. A propulsor is connected to be driven by the shaft. The propulsor is configured to pivot to a first orientation configured to produce lift when the motor rotates the shaft in a first direction, and to pivot to a second orientation configured to produce thrust when the motor rotates the shaft in a second direction that is opposite of the first direction.

17 Claims, 4 Drawing Sheets

SELF-ORIENTING PODS

CROSS REFERENCE TO RELATED APPLICATIONS

This application claims priority to U.S. Provisional Patent Application No. 63/057,702, filed Jul. 28, 2020. The entire contents of this application are incorporated herein by reference.

BACKGROUND

1. Field

The present disclosure relates to aircraft propulsion, and more particularly to pivoting propulsor unites, e.g., ducted fan pods and the like, such as used in vertical takeoff and landing (VTOL) aircraft.

2. Description of Related Art

Many VTOL aircraft concepts use pivoting propulsor units for lift and thrust. In traditional applications, the orientations of those propulsors is actively changed during flight, e.g., with a vertical orientation during the hover phase, and a horizontal orientation during the forward flight phase. Traditionally, this configuration is achieved with inline motors to turn the propulsors, and actuators to orient the entire assembly based on flight phase. These motors and accompanying hardware add weight, complexity, and cost.

The conventional techniques have been considered satisfactory for their intended purpose. However, there is an ever present need for improved systems and methods for improved propulsor units. This disclosure provides a solution for this need.

SUMMARY

A system includes an electric motor. A drive shaft is connected to be driven by the electric motor. A propulsor is connected to be driven by the shaft. The propulsor is configured to pivot to a first orientation configured to produce lift when the motor rotates the shaft in a first direction, and to pivot to a second orientation configured to produce thrust when the motor rotates the shaft in a second direction that is opposite of the first direction.

The system can include a main aircraft body. The electric motor can be mounted stationary relative to the main aircraft body. The drive shaft can be rotatably mounted to rotate relative to the main aircraft body to drive the propulsor. The propulsor can be included in a propulsor unit. The propulsor unit can be mounted to the main aircraft body with a bearing that is configured to allow the propulsor unit to rotate relative to the main aircraft body back and forth between the first and second orientations. The propulsor can be configured to pivot back and forth between the first and second orientations under the actuation of torque from the drive shaft without any other actuator.

The main aircraft body can include a first stationary stop member and the propulsor unit can include a first rotational stop member configured to engage the first stationary stop member to prevent rotation of the propulsor unit beyond the first orientation with the drive shaft rotating in the first direction. The main aircraft body can include a second stationary stop member and the propulsor unit can include a second rotational stop member configured to engage the second stationary stop member to prevent rotation of the propulsor unit beyond the second orientation with the drive shaft rotating in the second direction.

The system can include at least one additional propulsor operatively connected to the main aircraft body to pivot between first and second orientations. The propulsor unit can include a pod. The propulsor can include a ducted fan within the pod. The motor can be outside the pod. The pod can be outside a main aircraft body.

A method includes powering a propulsor with a motor turning in a first direction, wherein the propulsor is in a first orientation. The method includes reversing power to the propulsor by turning the motor in a second direction opposite the first direction. Reversing power to the propulsor changes orientation of the propulsor to a second orientation.

The first orientation can be configured for vertical thrust, and wherein the second orientation can be configured for horizontal thrust. Changing orientation of the propulsor can be accomplished solely by changing direction of the motor, without a dedicated actuator for changing orientation of the propulsor. The method can include holding the propulsor in the first orientation when the motor turns the first direction. The method can include stopping changing orientation of the propulsor in the second orientation. The method can include holding the propulsor in the second orientation when the motor turns the second direction.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
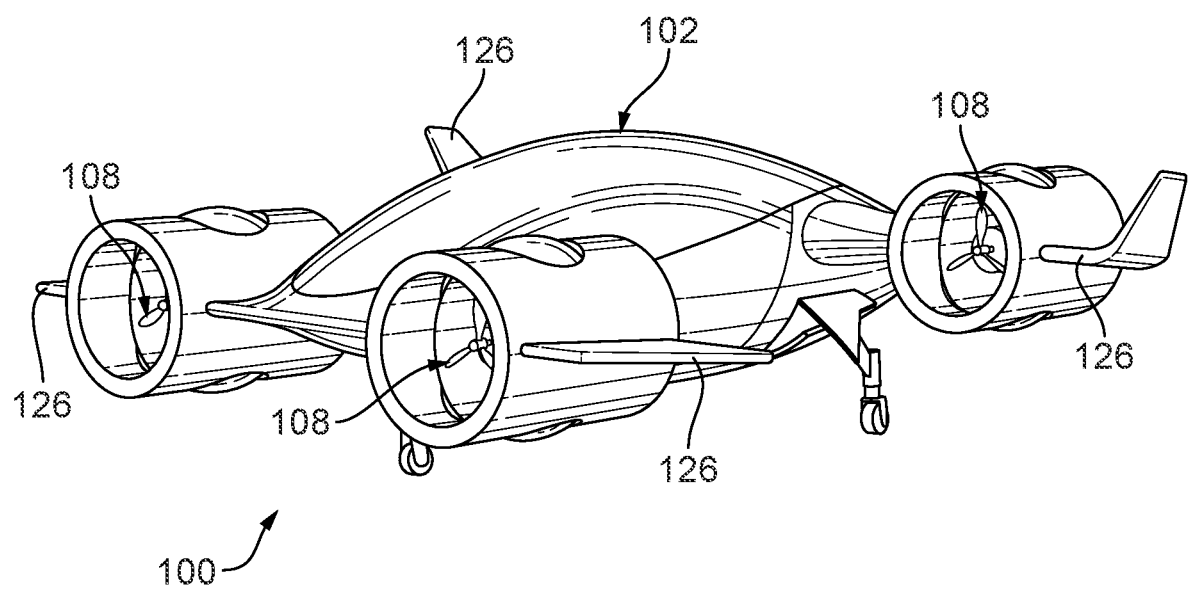
FIG. 1 is a schematic perspective view of an embodiment of a system constructed in accordance with the present disclosure, showing a main aircraft body with a plurality of propulsors.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to actuate propulsor orientation in vertical takeoff and landing (VTOL) aircraft.

Figure 2:
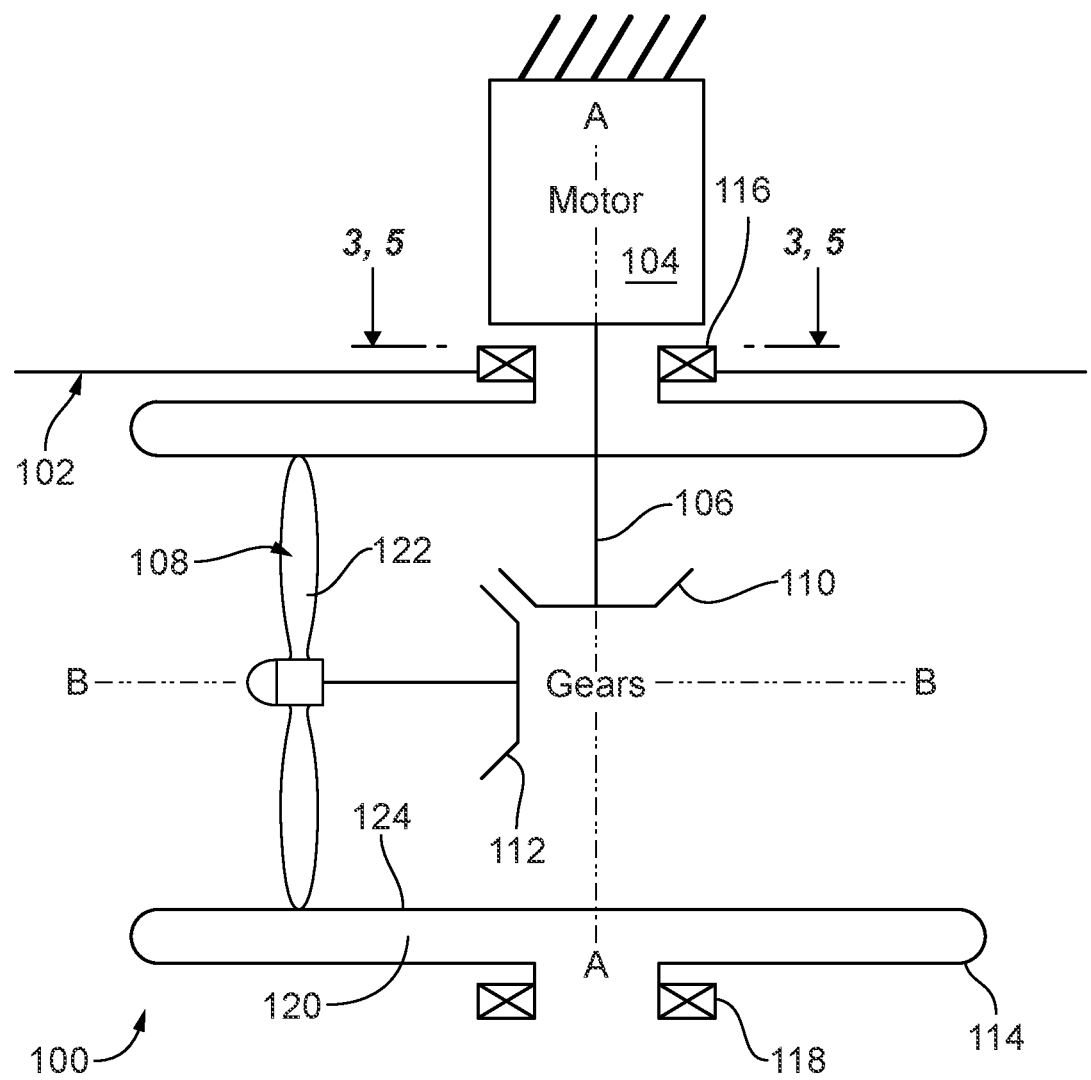
FIG. 2 is a schematic plan view of a portion of the system of FIG. 1, showing the motor, drive shaft, and propulsor.

The system includes a main aircraft body 102. As shown in FIG. 2, the system 100 includes an electric motor 104 mounted stationary relative to the main aircraft body 102. A drive shaft 106 is connected to be driven by the electric motor 104. The drive shaft 106 is rotatably mounted to rotate relative to the main aircraft body 102 to drive the propulsor 108. The propulsor 108 is connected to be driven by the shaft 106 through a train of gears 110, 112 on drive shaft 106 and the propulsor 108 respectively. The gears 110, 112 connect the drive shaft 106 to the propulsor 108 so that the axis A of rotation of the drive shaft is orthogonal to the rotational axis B of the propulsor 108.

The propulsor 108 is included in a propulsor unit 114. The propulsor unit 114 is mounted to the main aircraft body 102 with a bearing 116 that is configured to allow the propulsor unit 114 to rotate or pivot relative to the main aircraft 102 body back and forth between the first and second orientations described below with respect to FIGS. 3-4. Only one bearing 116 is needed, e.g. if the aircraft body 102 is a rotating wing type VTOL aircraft where the wings 126 pivot together with the propulsor 108, or an optional second bearing 118 can be included, e.g. for a rotating propulsor type VTOL aircraft where the wings 126 always stay level relative to the aircraft body 102. As shown in FIG. 1, the system 100 includes multiple propulsors operatively connected to the main aircraft body 102, each similar to that shown in FIG. 2. As also shown in FIG. 2, the propulsor unit 114 includes a pod 120. The propulsor 108 includes a ducted fan, i.e. with a fan 122 within the duct 124 within the pod 120. The motor 104 is outside of the pod 120. The pod 120 is outside of the main aircraft body 102. It is also contemplated that the pod 120 does not have to be "outside" of the aircraft body 102, e.g., if pods are embedded in an aircraft structure and are used as inlet/outlet ducts.

Figure 3:
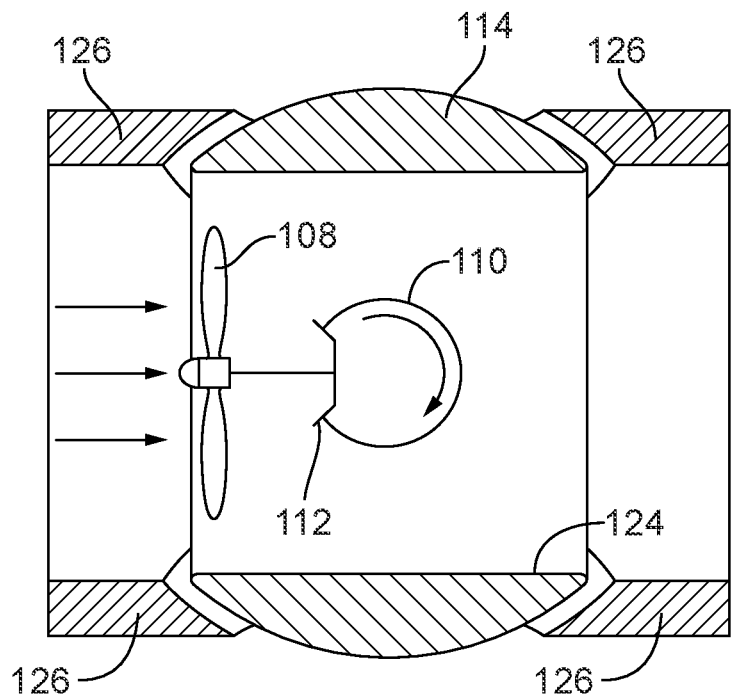
FIG. 3 is a schematic side elevation view of the propulsor of FIG. 2, showing the propulsor in the thrust orientation.
Figure 4:
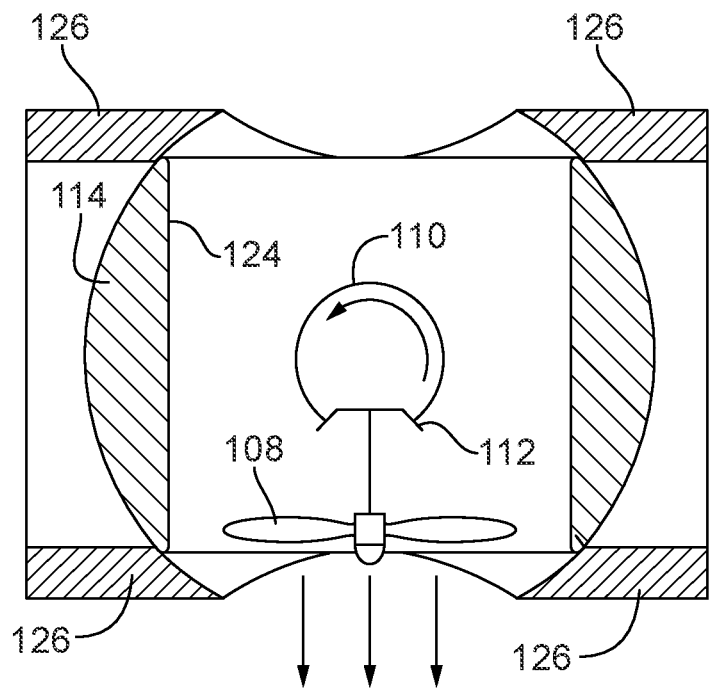
FIG. 4 is a schematic side elevation view of the propulsor of FIG. 2, showing the propulsor in the lift orientation.

With reference now to FIGS. 3 and 4, the propulsor 108 is configured to pivot to a first orientation, shown in FIG. 4, configured to produce lift when the motor 104 (shown in FIG. 2) rotates the shaft 106 in a first direction, e.g. counter-clockwise as indicated by the circular arrow in FIG. 4. The propulsor 108 is also configured to pivot to a second orientation, shown in FIG. 3, to produce thrust when the motor 104 (shown in FIG. 2) rotates the shaft 106 in a second direction that is opposite of the first direction, e.g. clockwise as indicated by the circular arrow in FIG. 3. The propulsor 108 is configured to pivot back and forth between the first and second orientations under the actuation of torque from the drive shaft 106 (shown in FIG. 2) without any other actuator.

Figure 5:
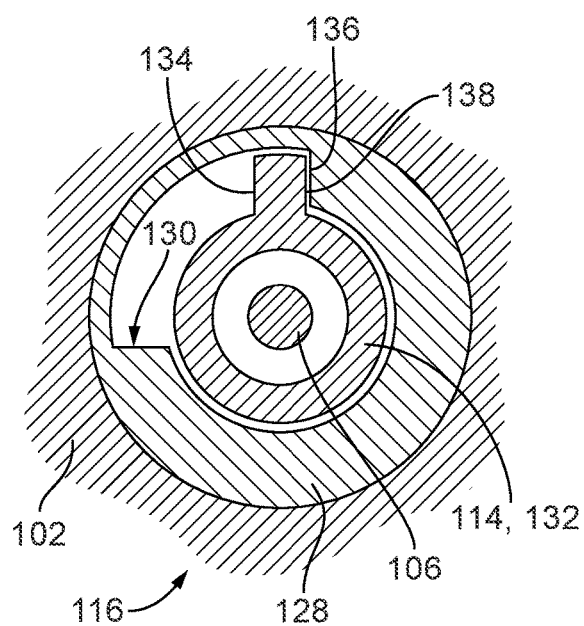
FIG. 5 is a schematic view of a portion of the system of FIG. 2, showing the stop members in the thrust orientation.

With reference now to FIG. 5, the main aircraft body 102 includes an outer race 128 of the bearing 116, which includes a first stationary stop member 136, which is a surface of the outer race 128. The propulsor unit 114 includes a first rotational stop member 138, which is a surface of the inner race 132 of the bearing 116 configured to engage the first stationary stop member 136 to prevent rotation of the propulsor unit 114 beyond the first orientation, shown in FIG. 4 with the drive shaft 106 (shown in FIG. 2) rotating in the first direction. In FIG. 4, three parallel arrows indicate the airflow through the propulsor unit 114 for generating lift in the first position of the propulsor unit 114. The torque from the drive shaft 106 (shown in FIG. 2) holds the bearing 116 in the position shown in FIG. 5 as long as the motor 104 (shown in FIG. 2) continues to drive in the first direction. This can be changed by reversing the direction of the motor 104. Those skilled in the art will readily appreciate that the stop members can be in any other form, and need not necessarily be included in the bearing 116.

Figure 6:
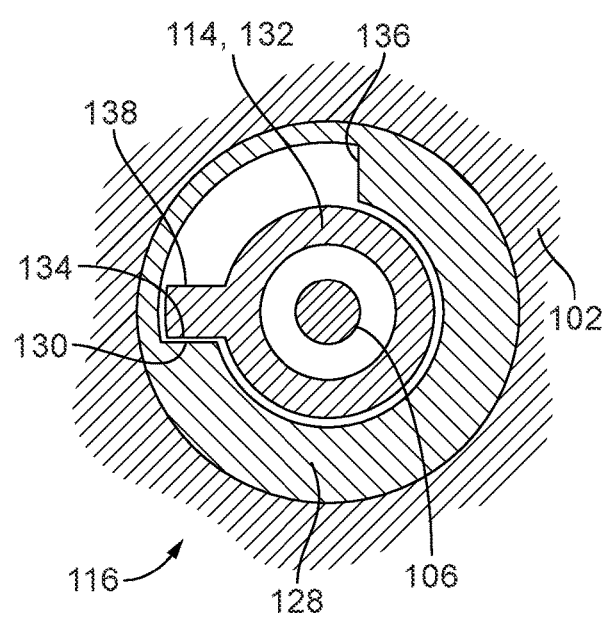
FIG. 6 is a schematic view of the system of FIG. 5, showing the stop members in the lift orientation.

With reference now to FIG. 6, the outer race 128 includes a second stationary stop member 130 and the inner race 132 includes a second rotational stop member 134 configured to engage the second stationary stop member 130 to prevent rotation of the propulsor unit 114 beyond the second orientation with the drive shaft 106 (shown in FIG. 2) rotating in the second direction, to hold the propulsor unit 114 in the thrust position shown in FIG. 3. In FIG. 3, three parallel arrows indicate the airflow through the propulsor unit 114 for generating thrust in the second position of the propulsor unit 114. The torque from the drive shaft 106 (shown in FIG. 2) holds the bearing 116 in the position shown in FIG. 6 as long as the motor 104 (shown in FIG. 2) continues to drive in the second direction. This can be changed back to the first position shown in FIG. 4 simply by reversing the direction of the motor 104. No other actuator is needed to change the direction of the propulsor unit 114 between the thrust and lift positions, so considerable weight and complexity is eliminated relative to traditional VTOL systems.

The methods and systems of the present disclosure, as described above and shown in the drawings, provide for actuation of propulsors for VTOL aircraft and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   an electric motor;
   a drive shaft connected to be driven by the electric motor; and
   a propulsor connected to be driven by the shaft, wherein the propulsor is configured to pivot to a first orientation configured to produce lift when the electric motor rotates the shaft in a first direction and to pivot to a second orientation configured to produce thrust when the electric motor rotates the shaft in a second direction that is opposite of the first direction, wherein the propulsor is configured to pivot back and forth between the first and second orientations under actuation of torque from the drive shaft without any other actuator, and wherein the electric motor is configured to both provide the actuation of the propulsor between the first and second orientations and power the propulsor to rotate to provide the thrust and lift.

2. The system as recited in claim 1, further comprising a main aircraft body, wherein the electric motor is mounted stationary to the main aircraft body, wherein the drive shaft is rotatably mounted to rotate relative to the main aircraft body to drive the propulsor, wherein the propulsor is included in a propulsor unit, and wherein the propulsor unit is mounted to the main aircraft body with a bearing that is configured to allow the propulsor unit to rotate relative to the main aircraft body back and forth between the first and second orientations.

3. The system as recited in claim 2, wherein the main aircraft body includes a first stationary stop member and the propulsor unit includes a first rotational stop member configured to engage the first stationary stop member to prevent rotation of the propulsor unit beyond the first orientation with the drive shaft rotating in the first direction.

4. The system as recited in claim 3, wherein the main aircraft body includes a second stationary stop member and the propulsor unit includes a second rotational stop member configured to engage the second stationary stop member to prevent rotation of the propulsor unit beyond the second orientation with the drive shaft rotating in the second direction.

5. The system as recited in claim 2, wherein the propulsor is a first propulsor, and further comprising at least one additional propulsor operatively connected to the main aircraft body to pivot between first and second orientations.

6. The system as recited in claim 2, wherein the propulsor unit includes a pod, and wherein the propulsor includes a ducted fan within the pod.

7. The system as recited in claim 6, wherein the electric motor is outside the pod.

8. The system as recited in claim 6, wherein the pod is outside the main aircraft body.

9. A method comprising:
powering a propulsor with a motor turning in a first direction, wherein the propulsor is in a first orientation relative to a main aircraft body; and
reversing power to the propulsor by turning the motor in a second direction opposite the first direction, wherein reversing power to the propulsor changes orientation of the propulsor to a second orientation relative to the main aircraft body, wherein the first orientation is configured for vertical thrust, wherein the second orientation is configured for horizontal thrust, wherein the propulsor is configured to pivot back and forth between the first and second orientations, wherein changing the orientation of the propulsor is accomplished solely by changing direction of the motor without a dedicated actuator for changing the orientation of the propulsor, wherein the propulsor is configured to pivot back and forth between the first and second orientations under actuation of torque from a drive shaft without any other actuator, and wherein the motor both provides the actuation of the propulsor between the first and second orientations and powers the propulsor to rotate to provide the horizontal thrust and the vertical thrust.

10. The method as recited in claim 9, further comprising holding the propulsor in the first orientation when the motor turns the first direction.

11. The method as recited in claim 10, further comprising stopping changing the orientation of the propulsor in the second orientation.

12. The method as recited in claim 11, further comprising holding the propulsor in the second orientation when the motor turns the second direction.

13. A system comprising:
an electric motor;
a drive shaft connected to be driven by the electric motor; and
a propulsor connected to be driven by the shaft, wherein the propulsor is configured to pivot to a first orientation configured to produce lift when the electric motor rotates the shaft in a first direction and to pivot to a second orientation configured to produce thrust when the electric motor rotates the shaft in a second direction that is opposite of the first direction, wherein the propulsor is mounted on a wing that is fixed to a main aircraft body, wherein the system is configured to change orientation of the propulsor solely by changing direction of the electric motor without a dedicated actuator for changing the orientation of the propulsor, wherein the propulsor is configured to pivot back and forth between the first and second orientations under actuation of torque from the drive shaft without any other actuator, and wherein the electric motor is configured to both provide the actuation of the propulsor between the first and second orientations and power the propulsor to rotate to provide the thrust and lift.

14. The system of claim 13 wherein the drive shaft is orthogonal to a rotational axis about which the propulsor rotates.

15. The system of claim 13 wherein the propulsor is included in a propulsor unit, and wherein the propulsor unit is mounted to the main aircraft body with a single bearing that is configured to allow the propulsor unit to rotate relative to the main aircraft body back and forth between the first and second orientations.

16. The system of claim 13 wherein the propulsor is disposed within a duct, wherein in the first orientation the propulsor is configured to push air in a first direction through a first opening of the duct, and wherein in the second orientation the propulsor is configured to push air in a second direction through a second opening of the duct.

17. The system of claim 13 wherein the propulsor is included in a propulsor unit, wherein the propulsor unit is mounted to the main aircraft body with a bearing that is configured to allow the propulsor unit to rotate relative to the main aircraft body back and forth between the first and second orientations, and wherein the drive shaft, the bearing, and the electric motor are configured such that the torque from the drive shaft holds the bearing in position while the electric motor rotates in the second direction.

\* \* \* \* \*